US012625419B2

(12) United States Patent
Chen

(10) Patent No.: US 12,625,419 B2
(45) Date of Patent: May 12, 2026

(54) PROJECTION APPARATUS

(71) Applicant: Coretronic Corporation, Hsin-Chu (TW)

(72) Inventor: Chang-Hsuan Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 482 days.

(21) Appl. No.: 18/171,681

(22) Filed: Feb. 21, 2023

(65) Prior Publication Data

US 2023/0266654 A1 Aug. 24, 2023

(30) Foreign Application Priority Data

Feb. 23, 2022 (CN) .......................... 202210166172.0

(51) Int. Cl.
*G03B 21/20* (2006.01)

(52) U.S. Cl.
CPC ....... *G03B 21/204* (2013.01); *G03B 21/2073* (2013.01); *G03B 21/208* (2013.01)

(58) Field of Classification Search
CPC . G03B 21/204; G03B 21/2073; G03B 21/208
USPC .......................................................... 353/20
See application file for complete search history.

(56) References Cited

U.S. PATENT DOCUMENTS

2006/0164600 A1* 7/2006 Morejon ............ G02B 27/1033
353/31
2008/0079904 A1* 4/2008 Bartlett ................ G03B 21/005
353/31

2009/0168134 A1* 7/2009 Nojima ................ H04N 9/3129
359/214.1
2021/0247679 A1 8/2021 Chang

FOREIGN PATENT DOCUMENTS

| CN | 1083932 | | 3/1994 |
|---|---|---|---|
| CN | 102722027 A | * | 10/2012 |
| CN | 209590522 U | | 11/2019 |
| CN | 111029906 | | 3/2021 |
| CN | 113219773 | | 8/2021 |

(Continued)

OTHER PUBLICATIONS

Translation of 102722027 (Year: 2025).*
"Office Action of China counterpart Application", issued on Dec. 4, 2025, p. 1-p. 9.

*Primary Examiner* — Jerry L Brooks
(74) *Attorney, Agent, or Firm* — JCIPRNET

(57) ABSTRACT

Provided is a projection apparatus including a light valve, a projection lens, and an illumination system including at least one light-source module, at least one focusing lens, and at least one diffusing element. The excitation beams pass through from the at least one light-source module to the focusing lens and the diffusing element sequentially to form an illumination beam. The maximum width of a first light spot formed by the excitation beams on a light-exit surface of the focusing lens is a first width. The maximum width of a second light spot formed on a light-exit surface of the diffusing element is a second width. The maximum width of a third light spot formed by the illumination beam on a light-incident surface of the light valve is a third width. The first width is greater than the second width, and the second width is greater than the third width.

24 Claims, 9 Drawing Sheets

(56)          References Cited

FOREIGN PATENT DOCUMENTS

| CN | 214151352 | U | 9/2021 |
|----|-----------|---|--------|
| CN | 214474389 |   | 10/2021 |
| CN | 113867088 | A | 12/2021 |
| CN | 113960868 | A | 1/2022 |

* cited by examiner 132
132SA
132LA 130

S3-W
S3(S3-LA) 200S 200(200-LS)
200-SS
S3-SA
200-D
S3-D θ

PROJECTION APPARATUS

CROSS-REFERENCE TO RELATED APPLICATION

This application claims the priority benefits of China application serial no. 202210166172.0, filed on Feb. 23, 2022. The entirety of the above-mentioned patent application is hereby incorporated by reference herein and made a part of this specification.

BACKGROUND

Technical Field

The invention relates to an optical apparatus, particularly to a projection apparatus.

Description of Related Art

The main light source of projection apparatus (such as projectors) on the current market are light-emitting diodes (LEDs) or laser diodes (LDs). To form an image on a screen, such projection apparatus is disposed with, for example, light sources of three different colors like red, green, and blue that are combined to provide an illumination beam guided directly into a homogenizer. The illumination beam is then directed through an optical element to a light valve to form an image beam that passes through a lens to form an image on the screen.

The pure laser projection apparatus takes on greater proportions in the market nowadays; meanwhile, there are also demands for high-brightness projection apparatus. In order for the projected image to have higher brightness, it is also an inevitable trend to add more laser light sources in the projection apparatus. However, it is not an easy task to design a light-combining element, as the light-combining structure is usually bulky and complicated. And the use of homogenizers and other optical elements tends to loss the light energy efficiency. In addition, the projection apparatus cannot be used to adjust the size and shape of a light spotlight spot at will, which limits the acceptance of the projection apparatus in the market.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a projection apparatus with a simple optical path structure that uses fewer optical elements, such that the production cost of the projection apparatus is lower and the light energy efficiency is better.

Other objects and advantages of the invention may be further understood from the technical features disclosed in the invention.

In order to achieve one, part, or all of the above objectives or other objectives, an embodiment of the invention provides a projection apparatus, which includes an illumination system, a light valve, and a projection lens. The illumination system is configured to provide an illumination beam. The light valve is disposed on the transmission path of the illumination beam and the light valve is configured to convert the illumination beam into an image beam. The projection lens is disposed on the transmission path of the image beam and is configured to project the image beam out of the projection apparatus. The illumination system includes at least one light-source module, at least one focusing lens, and at least one diffusing element. The light-source module is configured to emit multiple excitation beams. The focusing lens and the diffusing element are disposed on the transmission path of the excitation beams emitted from the light-source module. The diffusing element is disposed between the focusing lens and the focal point of the focusing lens, and the excitation beams sequentially pass through the focusing lens and the diffusing element to form the illumination beam. The maximum width of a first light spot formed by the excitation beams on a light-exit surface of the focusing lens is a first width. The maximum width of a second light spot formed on a light-exit surface of the diffusing element is a second width. The maximum width of a third light spot formed by the illumination beam on a light-incident surface of the light valve is a third width. The first width is greater than the second width, and the second width is greater than the third width.

In an embodiment of the invention, the diffusing element is located behind ½ of the total beam transmission path. The total beam transmission path includes the transmission path of the excitation beams emitted from the light-source module to the diffusing element and the transmission path of the illumination beam transmitted from the diffusing element to the light valve.

In an embodiment of the invention, each of the excitation beams forms a first sub-light spot on the light-exit surface of the focusing lens. The maximum width of the first sub-light spot is a first sub-width. Each of excitation beams forms a second sub-light spot on the light-exit surface of the diffusing element. The maximum width of the second sub-light spot is a second sub-width. Each of illumination sub-beams formed correspondingly by each of excitation beams passing through the diffusing element forms a third sub-light spot on the light-incident surface of the light valve. The maximum width of the third sub-light spot is a third sub-width. The first sub-width is larger than the second sub-width, and the second sub-width is smaller than the third sub-width.

In an embodiment of the invention, the range of the third sub-light spot covering the light valve is equal to or greater than 70% of the area of the light valve.

In an embodiment of the invention, the diffusing element is an asymmetric diffusing element, and the light spot of the illumination beam passing through the diffusing element has a long axis and a short axis.

In an embodiment of the invention, the diffusing element includes multiple lenses disposed in arrays, and each of the lenses has a long axis and a short axis.

In an embodiment of the invention, the long axis of the third light spot corresponds to the long side of the light valve, and the short axis of the third light spot corresponds to the short side of the light valve.

In an embodiment of the invention, the third light spot is quadrilateral, and the included angle between the diagonal line of the third light spot and the diagonal line of the light valve is 10 degrees or less.

In an embodiment of the invention, the light-source module further includes at least one light-combining element. The light-combining element is disposed on the transmission path of the excitation beams emitted from the light-source module, and the light-combining element is located between an excitation-light source of the light-source module and the focusing lens.

In an embodiment of the invention, the illumination system further includes a beam-adjusting element. The beam-adjusting element is disposed on the transmission path of the illumination beam transmitted from the diffusing element, and the beam-adjusting element is located between the diffusing element and the light valve. The illumination beam forms a fourth light spot on a light-exit surface of the beam-adjusting element. The maximum width of the fourth light spot is a fourth width. The second width is greater than the fourth width, and the fourth width is greater than the third width.

In an embodiment of the invention, the beam-adjusting element includes at least one of a depolarizer and a de-speckle element.

In an embodiment of the invention, each of the excitation beams forms a first sub-light spot on the light-exit surface of the focusing lens. The maximum width of the first sub-light spot is a first sub-width. Each of excitation beams forms a second sub-light spot on the light-exit surface of the diffusing element. The maximum width of the second sub-light spot is a second sub-width. Illumination sub-beams formed correspondingly by each of excitation beams passing through the diffusing element form a third sub-light spot on the light-incident surface of the light valve. The maximum width of the third sub-light spot is a third sub-width. Each of the illumination sub-beams forms a fourth sub-light spot on the light-exit surface of the beam-adjusting element. The maximum width of the fourth sub-light spot is a fourth sub-width. The first sub-width is greater than the second sub-width. The second sub-width is smaller than the fourth sub-width, and the fourth sub-width is smaller than the third sub-width.

In an embodiment of the invention, the beam-adjusting element is located behind ½ of the total beam transmission path. The total beam transmission path includes the transmission path of the excitation beams emitted from the light-source module to the diffusing element and the transmission path of the illumination beam transmitted from the diffusing element to the light valve.

In an embodiment of the invention, the illumination system further includes at least one first actuating element. The first actuating element is connected to the focusing lens and configured to move the position of the focusing lens. The position and the size of the third light spot relative to the light-incident surface change with the movement of the focusing lens.

In an embodiment of the invention, the illumination system further includes at least one driving element. The driving element is connected to the diffusing element, and the diffusing element has an optical axis passing through its center. The driving element is configured to drive the diffusing element to rotate around the optical axis. The position of the third light spot relative to the light-incident surface changes with the rotation of the diffusing element.

In an embodiment of the invention, the illumination system further includes at least one second actuating element. The second actuating element is connected to the diffusing element. The diffusing element has an optical axis passing through its center, and the second actuating element is configured to move the position of the diffusing element along the optical axis. The size of the third light spot expands as the diffusing element moves toward the focusing lens and decreases as the diffusing element moves toward the light valve.

In an embodiment of the invention, the illumination system further includes multiple light-source devices, and the light-source devices include multiple light-source modules. The number of the focusing lens is plural, and the number of the diffusing element is plural. Each light-source device respectively corresponds to one of the focusing lenses and one of the diffusing elements.

In an embodiment of the invention, the illumination system further includes a light-combining lens. The light-combining lens is disposed on the transmission path of the illumination beam transmitted from the diffusing element, and the light-combining lens is located between the diffusing element and the light valve.

In an embodiment of the invention, the excitation beams passing through the at least one focusing lens include at least one light color.

In an embodiment of the invention, the illumination system further includes a reflector. The reflector is disposed on the transmission path of the illumination beam transmitted from the diffusing element, and the reflector is located between the diffusing element and the light valve. The maximum width of a fifth light spot formed by the illumination beam on a light-incident surface of the reflector is a fifth width. The second width is greater than the fifth width, and the fifth width is greater than the third width.

In an embodiment of the invention, each of excitation beams forms a first sub-light spot on the light-exit surface of the focusing lens. The maximum width of the first sub-light spot is a first sub-width. The maximum width of the second sub-light spot formed by each of excitation beams on the light-exit surface of the diffusing element is a second sub-width. Each of illumination sub-beams formed correspondingly by each of excitation beams passing through the diffusing element forms a third sub-light spot on the light-incident surface of the light valve. The maximum width of the third sub-light spot is a third sub-width. The illumination sub-beam forms a fifth sub-light spot on the light-incident surface of the reflector. The maximum width of the fifth sub-light spot is a fifth sub-width. The first sub-width is larger than the second sub-width, the second sub-width is smaller than the fifth sub-width, and the fifth sub-width is smaller than the third sub-width.

In an embodiment of the invention, the reflector is located behind ½ of the total beam transmission path, and the total beam transmission path includes the transmission path of the excitation beams emitted from the light-source module to the diffusing element and the transmission path of the illumination beam transmitted from the diffusing element to the light valve.

In an embodiment of the invention, the light-source module further includes at least one beam splitter. The beam splitter is disposed on the transmission path of the excitation beams emitted from the light-source module, and the beam splitter is located between an excitation-light source of the light-source module and the focusing lens.

Based on the above, in an embodiment of the invention, the projection apparatus adopts a focusing lens to focus the beam on the light valve, and then uses the diffusing element to diffuse the beam asymmetrically, such that the beam does not have a focusing point between the focusing lens and the light valve, and the beams are diffused to the shape and the size of the light valve, such that the first width of the first light spot is larger than the second width of the second light spot, and the second width of the second light spot is larger than the third width of the third light spot. As such, the projection apparatus achieves the effect of light spot shaping and uniform illumination only by using the focusing lens and the diffusing element.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWING

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
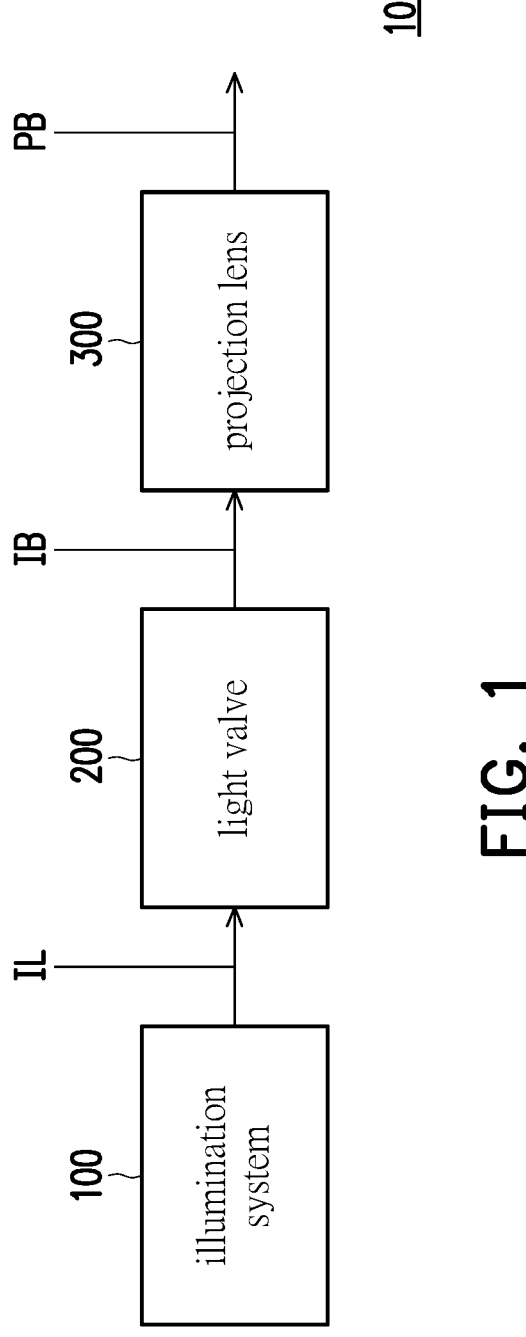
FIG. 1 is a schematic diagram of a projection apparatus according to an embodiment of the invention.

FIG. 1 is a schematic diagram of a projection apparatus according to an embodiment of the invention. In FIG. 1, an embodiment of the invention provides a projection apparatus 10, which includes an illumination system 100, a light valve 200, and a projection lens 300. The illumination system 100 is configured to provide an illumination beam IL. The light valve 200 is disposed on the transmission path of the illumination beam IL, and is configured to convert the illumination beam IL into an image beam IB. The projection lens 300 is disposed on the transmission path of the image beam IB, and is configured to project the image beam IB out of the projection apparatus 10 to form a projection beam PB on a projection target (not shown), such as a screen or a wall.

In this embodiment, the light valve 200 is, for example, a spatial light modulator, such as a digital micro-mirror device (DMD), a liquid-crystal-on-silicon panel (LCOS panel), or a liquid crystal panel (LCD). The projection lens 300 is, for example, a combination including one or more optical lenses having a diopter. Optical lenses include, for example, various combinations of non-planar lenses such as bi-concave lenses, bi-convex lenses, meniscus lenses, convex-concave lenses, plano-convex lenses, and plano-concave lenses. The invention does not limit the configurations and types of the light valve 200 and the projection lens 300.

Figure 2:
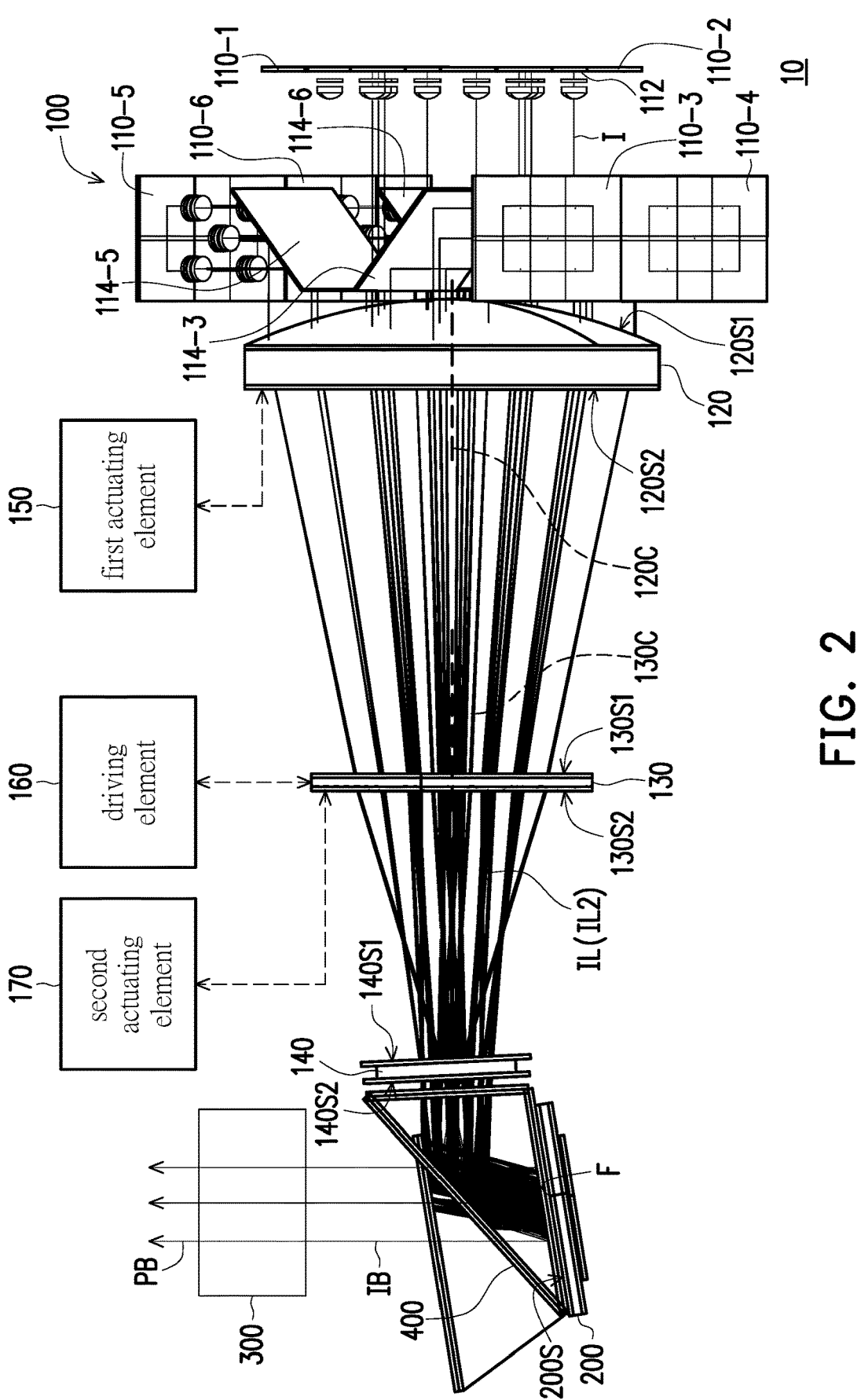
FIG. 2 is a schematic diagram of a projection apparatus according to a first embodiment of the invention.

FIG. 2 is a schematic diagram of a projection apparatus according to a first embodiment of the invention. In FIG. 2, the illumination system 100 of this embodiment includes at least one light-source module 110-1, 110-2, 110-3, 110-4, 110-5, and 110-6, at least one focusing lens 120, and at least one diffusing element 130. Each of the light-source modules 110-1, 110-2, 110-3, 110-4, 110-5, and 110-6 includes at least one excitation-light source 112. Each excitation-light source 112 is configured to emit an excitation beam I, such that the light-source modules 110-1, 110-2, 110-3, 110-4, 110-5, and 110-6 emit a plurality of excitation beams I. The excitation-light source 112 may be a light-emitting diode (LED), a laser diode (LD), other suitable light sources, or a combination thereof, to which the invention is not limited. The excitation beams I may be a red light, a green light, a blue light, an infrared light, an ultraviolet light, or a beam of other colors. In this embodiment, the light-source modules 110-1, 110-2, 110-3, 110-4, 110-5, and 110-6 include the plurality of excitation-light sources 112 disposed in arrays, and the excitation beams I emitted by the excitation-light sources 112 of each of the light-source modules 110-1, 110-2, 110-3, 110-4, 110-5, and 110-6 may simultaneously include three different wavelengths of beams; for example, it includes a combination of any three or more of red light, green light, blue light, infrared light, and ultraviolet light. In this embodiment, the number of light-source modules is 6, for example. In other embodiments, the number of light-source modules may be any number, as it may be adjusted according to the requirements of the projection apparatus, and the invention is not limited thereto.

In this embodiment, the focusing lens 120 and the diffusing element 130 are disposed on the transmission path of the excitation beams I emitted from the light-source modules 110-1, 110-2, 110-3, 110-4, 110-5, and 110-6, and the diffusing element 130 is disposed between the focusing lens 120 and a focal point F of the focusing lens 120. The excitation beams I sequentially passes through the focusing lens 120 and the diffusing element 130 and then is transmitted to the light valve 200. Each of excitation beams I passes through the diffusing element 130 to form an illumination sub-beam IL2, and a collection of at least one of the illumination sub-beams IL2 forms an illumination beam IL. In other words, the excitation beams I sequentially pass through the focusing lens 120 and the diffusing element 130 to form the illumination beam IL. In one embodiment, the excitation beams I passing through the focusing lens 120 includes at least one light color.

Figure 3:
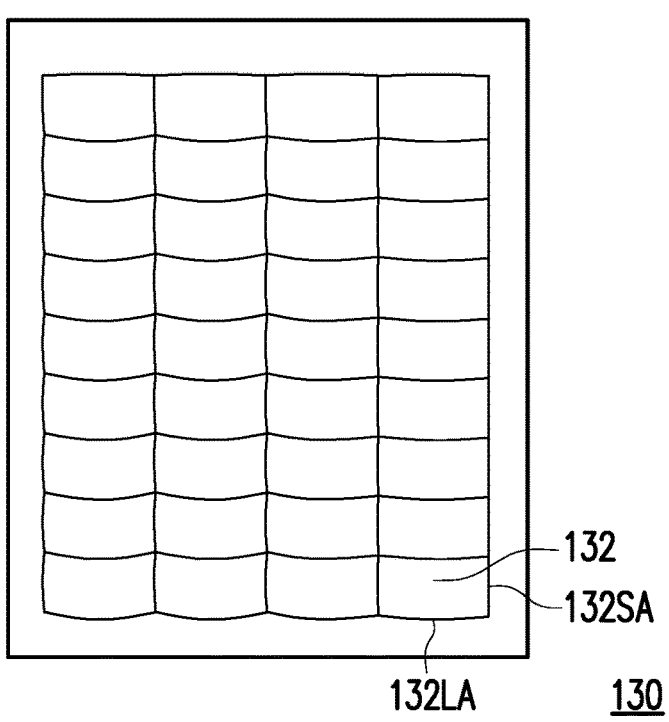
FIG. 3 is a schematic diagram of a diffusing element of a projection apparatus according to an embodiment of the invention.

FIG. 3 is a schematic diagram of a diffusing element of a projection apparatus according to an embodiment of the invention. Please refer to FIG. 2 and FIG. 3 at the same time. In this embodiment, the diffusing element 130 may be an asymmetric diffusing element, and the light spot of the illumination beam IL passing through the diffusing element 130 has a long axis and a short axis (such as the long axis S3-LA and the short axis S3-SA of the third light spot S3 shown in FIG. 4). For example, the diffusing element 130 in FIG. 3 includes a plurality of lenses 132 disposed in arrays. The diffusing element 130 has an optical axis 130C passing through its center. The cross-sectional profile of each lens 132 in a direction perpendicular to its optical axis 130C is, for example, a quadrilateral, and each lens 132 has a long axis 132LA and a short axis 132SA. In another embodiment, the diffusing element 130 may be an asymmetric diffuser.

In this embodiment, the diffusing element 130 is located behind ½ of a total beam transmission path, which means the diffusing element 130 is located in the second half of the total beam transmission path. The total beam transmission path includes the transmission path of the excitation beams I emitted from the light-source modules 110-1, 110-2, 110-3, 110-4, 110-5, and 110-6 to the diffusing element 130 and the transmission path of the illumination beam IL transmitted from the diffusing element 130 to the light valve 200. In other words, the distance of the transmission path of the excitation beams I emitted from the light-source modules 110-1, 110-2, 110-3, 110-4, 110-5, and 110-6 to the diffusing element 130 is greater than the distance of the transmission path of the illumination beam IL transmitted from the diffusing element 130 to the light valve 200. Since the functional elements such as the diffusing element 130 are placed at a position (behind ½ of the total beam transmission path) where the light spot formed thereby is smaller, the diffusing element 130 with a smaller volume may be adopted here, such that the overall production cost of the projection apparatus 10 is lower and the volume is smaller.

Figure 4:
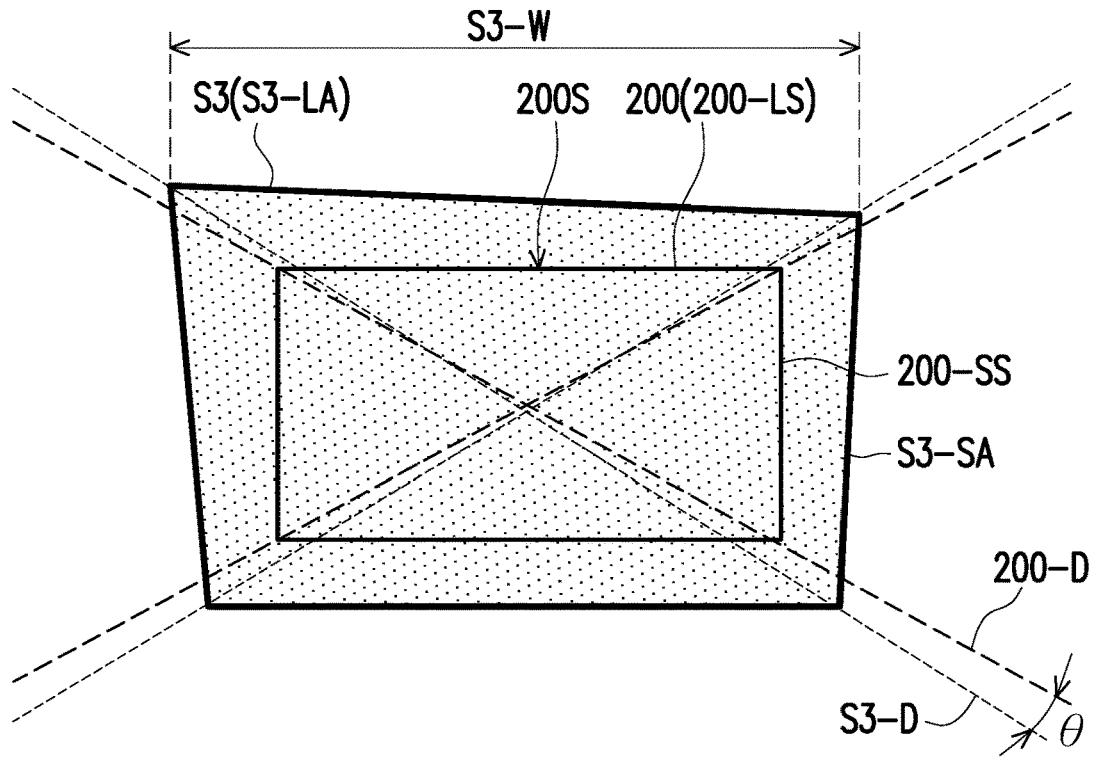
FIG. 4 is a schematic diagram of a third light spot formed by the illumination beam of the projection apparatus on the light-incident surface of the light valve according to an embodiment of the invention.

FIG. 4 is a schematic diagram of a third light spot formed by the illumination beam of the projection apparatus on the light-incident surface of the light valve according to an embodiment of the invention. Please refer to FIG. 2 and FIG. 4 at the same time. In this embodiment, the focusing lens 120 and the diffusing element 130 respectively have light-incident surfaces 120S1 and 130S1 facing the light-source modules 110-1, 110-2, 110-3, 110-4, 110-5, and 110-6, and light-exit surfaces 120S2 and 130S2 facing the light valve 200. A maximum width of a first light spot formed by the excitation beams I on the light-exit surface 120S2 of the focusing lens 120 is a first width. A maximum width of a second light spot formed on the light-exit surface 130S2 of the diffusing element 130 is a second width. A maximum width of a third light spot S3 formed by the illumination beam IL on the light-incident surface 200S of the light valve 200 is a third width S3-W. Since the volume of the light-source modules 110-1, 110-2, 110-3, 110-4, 110-5, and 110-6 is larger than that of the light valve 200, in order to adjust the degree of diffusion of the beam to be similar to a shape and a size of the light valve 200, the design of the projection apparatus 10 is disposed with a beam that gradually reduces from the focusing lens 120 to the light valve 200. More specifically, the first width of the first light spot is greater than the second width of the second light spot, and the second width of the second light spot is greater than the third width S3-W of the third light spot S3.

In this embodiment, each of excitation beams I forms a first sub-light spot on the light-exit surface 120S2 of the focusing lens 120, and a maximum width of the first sub-light spot is a first sub-width. Each of excitation beams I forms a second sub-light spot on the light-exit surface 130S2 of the diffusing element 130, and a maximum width of the second sub-light spot is a second sub-width. The illumination sub-beam IL2 formed correspondingly by each of excitation beams I passing through the diffusing element 130 forms a third sub-light spot on the light-incident surface 200S of the light valve 200, and a maximum width of the third sub-light spot is a third sub-width. The diffusing element 130 is configured to adjust the beam diffusion degree to approximate the shape and the size of the light valve 200. When there is only one excitation beam I, as the volume of one excitation-light source 112 is smaller than that of the light valve 200, the beam (the illumination sub-beam IL2) is enlarged gradually from the diffusing element 130 to the light valve 200. More specifically, the first sub-width of the first sub-light spot is larger than the second sub-width of the second sub-light spot, and the second sub-width of the second sub-light spot is smaller than the third sub-width of the third sub-light spot.

In this embodiment, after the illumination beam IL passes through the diffusing element 130, the contour of the third light spot S3 formed by the illumination beam IL on the light-incident surface 200S of the light valve 200 is quadrilateral. More specifically, the third light spot S3 is a quadrilateral that has a long axis S3-LA and a short axis S3-SA, and the long axis S3-LA of the third light spot S3 corresponds to the long side 200-LS of the light valve 200, and the short axis S3-SA of the third light spot S3 corresponds to the short side 200-SS of the light valve 200. As shown in FIG. 4, the long axis S3-LA of the third light spot S3 is equal to or greater than the long side 200-LS of the light valve 200, and the short axis S3-SA of the third light spot S3 is equal to or greater than the short side 200-SS of the light valve 200. The included angle θ between a diagonal line S3-D of the third light spot S3 and a diagonal line 200-D of the light valve 200 is 10 degrees or less. In addition, a range of the third light spot S3 corresponding to the excitation beams I (as shown in FIG. 2) is equal to or greater than the area of an effective imaging area of the light valve 200, and the range of the third sub-light spot correspondingly by each of excitation beams I covering the light valve 200 is equal to or greater than 70% of the area of the effective imaging area of the light valve 200. In other embodiments, the cross-sectional profile of the lens 132 of the diffusing element 130 in the direction perpendicular to the optical axis 130C thereof and the contour of the third light spot S3 may be shapes other than quadrilateral. The invention does not specifically limit the shape of the lens 132 and the contour of the third light spot S3.

Again in FIG. 2, in this embodiment, the light-source modules 110-1, 110-2, 110-3, 110-4, 110-5, and 110-6 further include: at least one light-combining elements 114-3, 114-5, and 114-6 configured to guide the excitation beams I emitted by the excitation-light sources 112 of the light-source modules 110-1, 110-2, 110-3, 110-4, 110-5, and 110-6 to the focusing lens 120. The light-combining elements 114-3, 114-5, and 114-6 may be reflectors or elements having a reflective area and/or a light-transmitting area. Three light-combining elements 114-3, 114-5, and 114-6 are adopted in this embodiment and are disposed on the transmission path of the excitation beams I emitted from the light-source modules 110-1, 110-2, 110-3, 110-4, 110-5, and 110-6, whereas the light-combining elements 114-3, 114-5, and 114-6 are disposed between the excitation-light source 112 of the light-source modules 110-1, 110-2, 110-3, 110-4, 110-5 and 110-6 and the focusing lens 120.

In this embodiment, the illumination system 100 further includes a beam-adjusting element 140. The beam-adjusting element 140 includes at least one of a depolarizer and a de-speckle element. The beam-adjusting element 140 is configured to adjust the beam. For example, a depolarizer depolarizes the illumination beam IL, and the de-speckle element eliminates the speckle of the illumination beam IL. The de-speckle element (de-speckler) is, for example, a diffusing sheet or an optical element vibrating device. The beam-adjusting element 140 is disposed on the transmission path of the illumination beam IL transmitted from the diffusing element 130. The beam-adjusting element 140 is located between the diffusing element 130 and the light valve 200, and is located behind ½ of the total beam transmission path. In this embodiment, the beam-adjusting element 140 has a light-incident surface 140S1 facing the diffusing element 130 and a light-exit surface 140S2 facing the light valve 200. The illumination beams IL form a fourth light spot on the light-exit surface 140S2 of the beam-adjusting element 140, and the maximum width of the fourth light spot is a fourth width. The second width of the second light spot formed on the diffusing element 130 is greater than the fourth width of the fourth light spot, and the fourth width of the fourth light spot is larger than the third width S3-W of the third light spot S3 (as shown in FIG. 4) formed on the light valve 200. In an embodiment of the invention, because of the beam-adjusting element 140 that may be disposed in the projection apparatus 10, the overall image effect of the image beam IB and/or the projection beam PB is better. As the functional elements such as the beam-adjusting element 140 are placed at the position (behind ½ of the total beam transmission path) where the light spot formed thereby is smaller, the beam-adjusting element 140 with a smaller volume may be adopted here, such that the overall production cost of the projection apparatus 10 is lower and the volume is smaller.

In this embodiment, each of the illumination sub-beams IL2 formed correspondingly by each of excitation beams I forms a fourth sub-light spot on the light-exit surface 140S2 of the beam-adjusting element 140. A maximum width of the fourth sub-light spot is a fourth sub-width. The second sub-width of the second sub-light spot formed at the diffusing element 130 is smaller than the fourth sub-width of the fourth sub-light spot, and the fourth sub-width of the fourth sub-light spot is smaller than the third sub-width of the third sub-light spot formed at the light valve 200.

Figure 5:
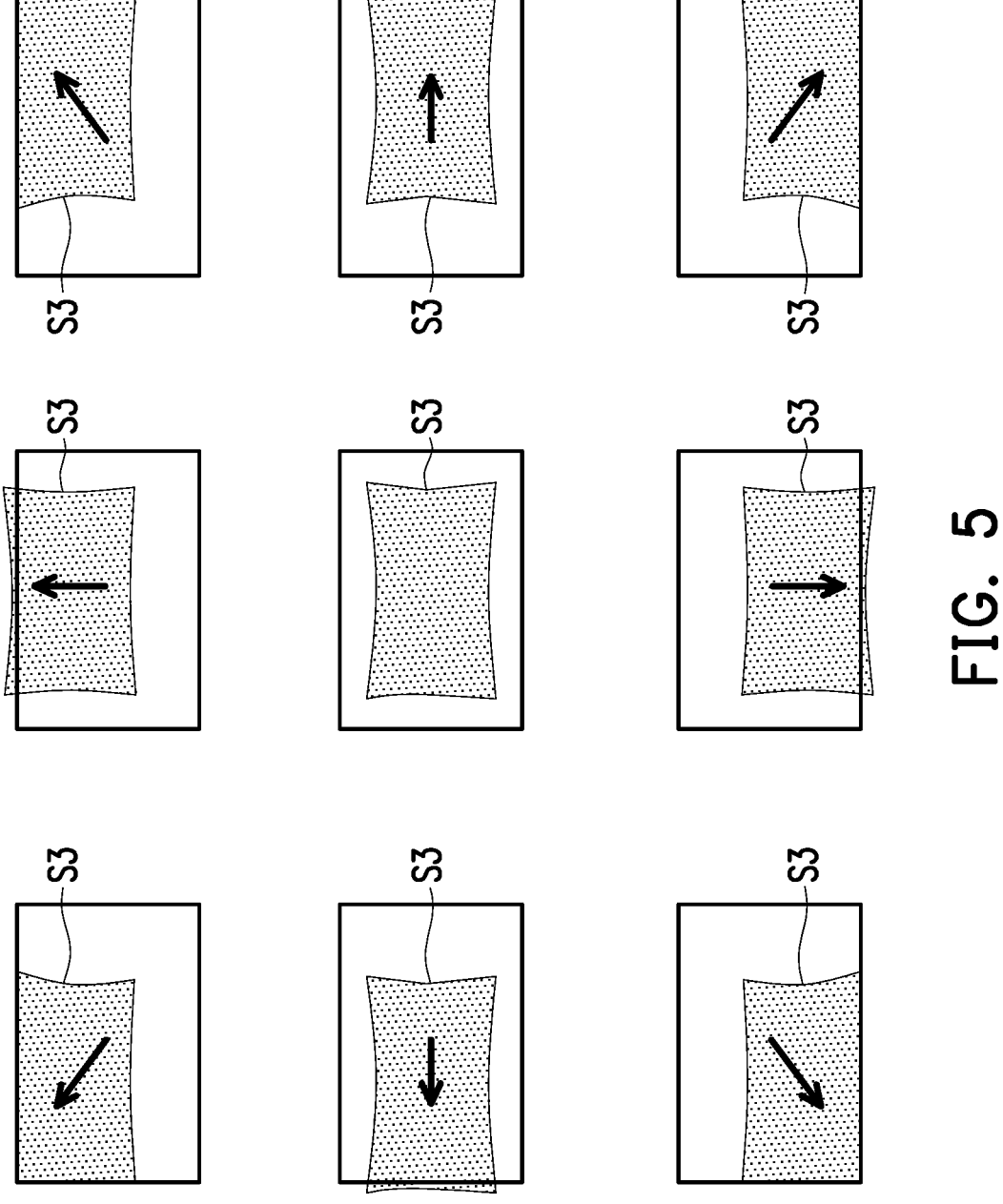
FIG. 5 is a schematic diagram showing that the position of the third light spot of a projection apparatus relative to the light-incident surface changes with the movement of a focusing lens according to an embodiment of the invention.

In this embodiment, the illumination system 100 further includes at least one first actuating element 150. The first actuating element 150 is connected to the focusing lens 120, and is configured to move a position of the focusing lens 120 in the three-dimensional direction. The position or the size of the third light spot S3 relative to the light-incident surface 200S changes with a movement of the focusing lens 120. Please refer to FIG. 2 and FIG. 5 at the same time. In an embodiment, FIG. 5 is a schematic diagram showing that the position of the third light spot of the projection apparatus relative to the light-incident surface changes with the movement of the focusing lens according to an embodiment of the invention. The focusing lens 120 has an optical axis 120C through its center, the optical axis 120C of the focusing lens 120 and the optical axis 130C of the diffusing element 130 are located on the same axis, and the first actuating element 150 is configured to move the position of the focusing lens 120 in the direction perpendicular to the optical axis 120C, such that the position of the third light spot S3 relative to the light-incident surface 200S of the light valve 200 may be changed. The light-incident surface 200S is indicated by a thick black frame in FIG. 5. For example, the third light spot S3 moves in directions perpendicular to the optical axis 120C upward, downward, left, right, etc. relative to the geometric center (not shown in the figure) of the light-incident surface 200S. In other embodiments, the first actuating element 150 moves the position of the focusing lens 120 along the optical axis 120C, and the size of the third light spot S3 expands as the focusing lens 120 moves toward the light-source modules 110-1, 110-2, 110-3, 110-4, 110-5, and 110-6, and reduces as the focusing lens 120 moves toward the light valve 200. The first actuating element 150 may be, for example, an actuator or an adjustment mechanism. The actuator is, for example, a motor, and the adjustment mechanism includes elements like screws, brackets, and springs. In an embodiment of the invention, as the projection apparatus 10 is able to adjust the focusing lens 120 to adjust the position and the size of the light spot, the mechanical assembly tolerance of the projection apparatus 10 may be reduced.

Figure 6:
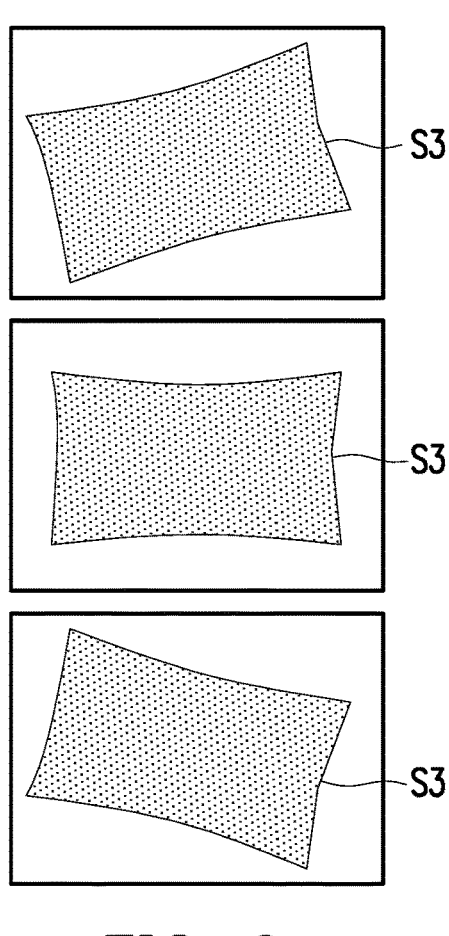
FIG. 6 is a schematic diagram showing that the position of the third light spot of a projection apparatus relative to the light-incident surface changes with the rotation of a diffusing element according to an embodiment of the invention.

FIG. 6 is a schematic diagram showing that the position of the third light spot of the projection apparatus relative to the light-incident surface changes with the rotation of the diffusing element according to an embodiment of the invention. Please refer to FIG. 2 and FIG. 6 at the same time. In this embodiment, the illumination system 100 further includes at least one driving element 160. The driving element 160 is connected to the diffusing element 130, and is configured to drive the diffusing element 130 to rotate around the optical axis 130C. The position of the third light spot S3 relative to the light-incident surface 200S of the light valve 200 changes with the rotation of the diffusing element 130. The light-incident surface 200S is indicated by a thick black frame in FIG. 6. In one embodiment, the driving element 160 may be, for example, a coil, a motor, or the like. Please refer to FIG. 4 and FIG. 6 at the same time. More specifically, in this embodiment, as the included angle θ between the diagonal line S3-D of the third light spot S3 and the diagonal line 200-D of the light valve 200 may be adjusted by the driving element 160, and the included angle θ may be adjusted to be 10 degrees or less, the mechanism assembly tolerance of the projection apparatus 10 may be reduced.

Figure 7:
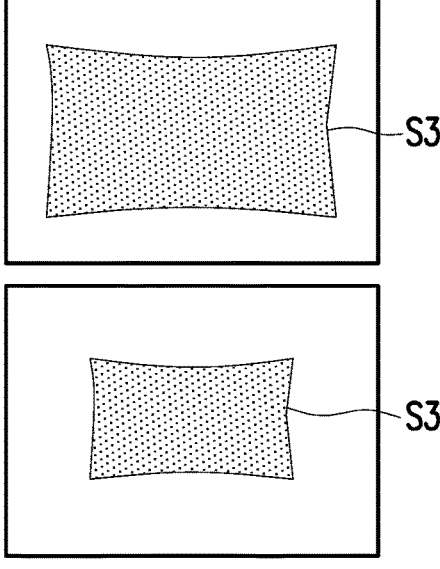
FIG. 7 is a schematic diagram showing that the size of the third light spot of a projection apparatus according to an embodiment of the invention expands as the diffusing element moves toward the focusing lens and decreases as the diffusing element moves toward the light valve.

FIG. 7 is a schematic diagram showing that the size of the third light spot of the projection apparatus according to an embodiment of the invention expands as the diffusing element moves toward the focusing lens, and decreases as the diffusing element moves toward the light valve. Please refer to FIG. 2 and FIG. 7 at the same time. In this embodiment, the illumination system 100 further includes at least one second actuating element 170. The second actuating element 170 is connected to the diffusing element 130, and is configured to move the position of the diffusing element 130 along the optical axis 130C. The size of the third light spot S3 expands as the diffusing element 130 moves toward the direction of the focusing lens 120, and decreases as the diffusing element 130 moves toward the light valve 200. The second actuating element 170 may be, for example, an actuator or an adjustment mechanism. The actuator is, for example, a motor, and the adjustment mechanism includes, for example, screws, brackets, springs, and other elements. In an embodiment of the invention, as the size of the third light spot S3 changes with the movement of the diffusing element 130 along the optical axis 130C and the position of the third light spot S3 rotates with the rotation of the diffusing element 130 around the optical axis 130C, the projection apparatus 10 is able to adjust the diffusing element 130 to adjust the size and position of the light spot on its own.

Based on the above, in an embodiment of the invention, the projection apparatus 10 includes at least one light-source module 110-1, 110-2, 110-3, 110-4, 110-5, and 110-6, at least one focusing lens 120, and at least one diffusing element 130. The beam (the excitation beams I) is focused on the light valve 200 by the focusing lens 120, and the beam (the illumination beam IL) is diffused asymmetrically by the diffusing element 130 and diffused to the shape and the size of the light valve 200, such that the light valve 200 converts the illumination beam IL effectively into the image beam IB. Compared with projection apparatus in the prior art that needs a homogenizer, a wavelength conversion element, a filter element, or other optical elements, the projection apparatus 10 of the embodiment of the invention does not need the additional elements as set forth but only needs a focusing lens 120 and a diffusing element 130 to achieve the effect of light spot shaping and uniform illumination; therefore, the production cost required for a projection apparatus 10 is lower because fewer optical elements are used. Because fewer optical elements are used in the projection apparatus 10, the light transmittance of beams is higher and the optical attenuation factors are reduced. In addition, the projection apparatus 10 has better space utilization as the optical structure thereof is allowed to accommodate six light-source modules 110-1, 110-2, 110-3, 110-4, 110-5, and 110-6. Furthermore, the projection apparatus 10 has a small etendue and is therefore suitable as a high-contrast projector.

Again in FIG. 2, in this embodiment, the projection apparatus 10 further includes a prism group 400. The prism group 400 may be a total internal reflection prism (TIR prism) composed of two prisms. The prism group 400 is disposed between the diffusing element 130 and the light valve 200 on the transmission path of the illumination beam IL, and is disposed between the light valve 200 and the projection lens 300 on the transmission path of the image beam IB. The illumination beam IL from the diffusing element 130 is first transmitted to the prism group 400, and is then reflected to the light valve 200 by the prism group 400, such that the focal point F of the focusing lens 120 falls on the light-incident surface 200S of the light valve 200. After the illumination beam IL is converted into the image beam IB by the light valve 200, the image beam IB enters and passes through the prism group 400 and is then transmitted to the projection lens 300.

Figure 8:
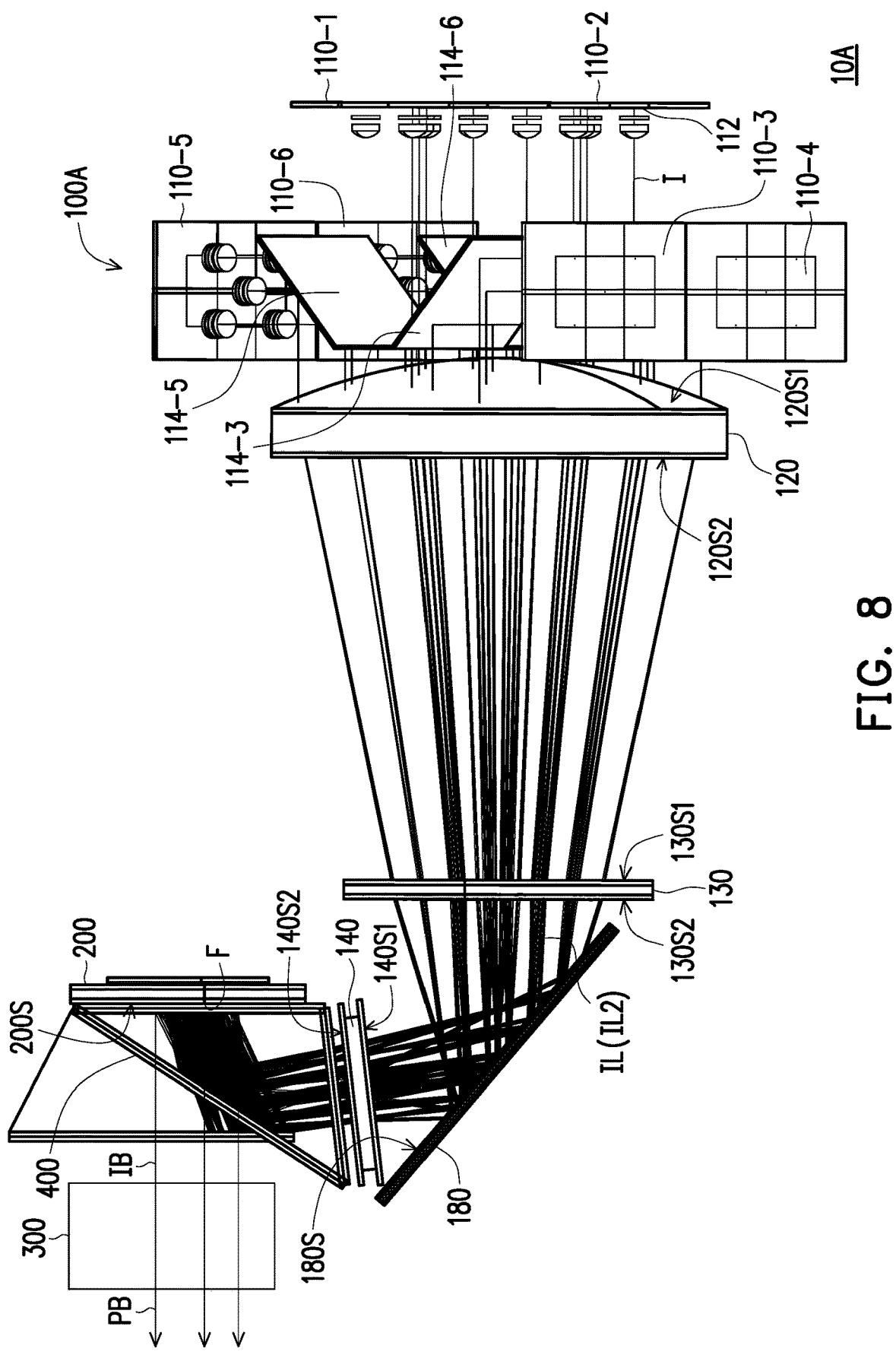
FIG. 8 is a schematic diagram of a projection apparatus according to a second embodiment of the invention.

FIG. 8 is a schematic diagram of a projection apparatus according to a second embodiment of the invention. In FIG. 8, the projection apparatus 10A of this embodiment is substantially the same as the projection apparatus 10 of FIG. 2, and their main difference is that the illumination system 100A further includes a reflector 180. In this embodiment, the reflector 180 is disposed on the transmission path of the illumination beam IL transmitted from the diffusing element 130. The reflector 180 is located between the diffusing element 130 and the light valve 200, and the reflector 180 is located behind ½ of the total beam transmission path. A maximum width of a fifth light spot formed by the illumination beam IL on a light-incident surface 180S of the reflector 180 is a fifth width. The second width of the second light spot formed on the diffusing element 130 is greater than the fifth width of the fifth light spot, and the fifth width of the fifth light spot is greater than the third width S3-W of the third light spot S3 (as shown in FIG. 4) formed at the light valve 200. However, as a functional element such as the reflector 180 are placed in a position (behind ½ of the total beam transmission path) where the light spot formed thereby is smaller, the reflector 180 with a smaller volume may be adopted here, such that the overall production cost of the projection apparatus 10A is lower and the volume is smaller. In addition, by disposing the reflector 180 between the diffusing element 130 and the light valve 200, the volume of the projection apparatus 10A may be reduced.

In this embodiment, each of the illumination sub-beams IL2 formed correspondingly by each of excitation beams I forms a fifth sub-light spot on the light-incident surface 180S of the reflector 180, and a maximum width of the fifth sub-light spot is a fifth sub-width. The second sub-width of the second sub-light spot formed at the diffusing element 130 is smaller than the fifth sub-width of the fifth sub-light spot, and the fifth sub-light spot of the fifth sub-light spot is smaller than the third sub-width of the third sub-light spot formed at the light valve 200. The advantages of the projection apparatus 10A of the present embodiment are similar to those of the projection apparatus 10, and details thereof are not described herein again.

Figure 9:
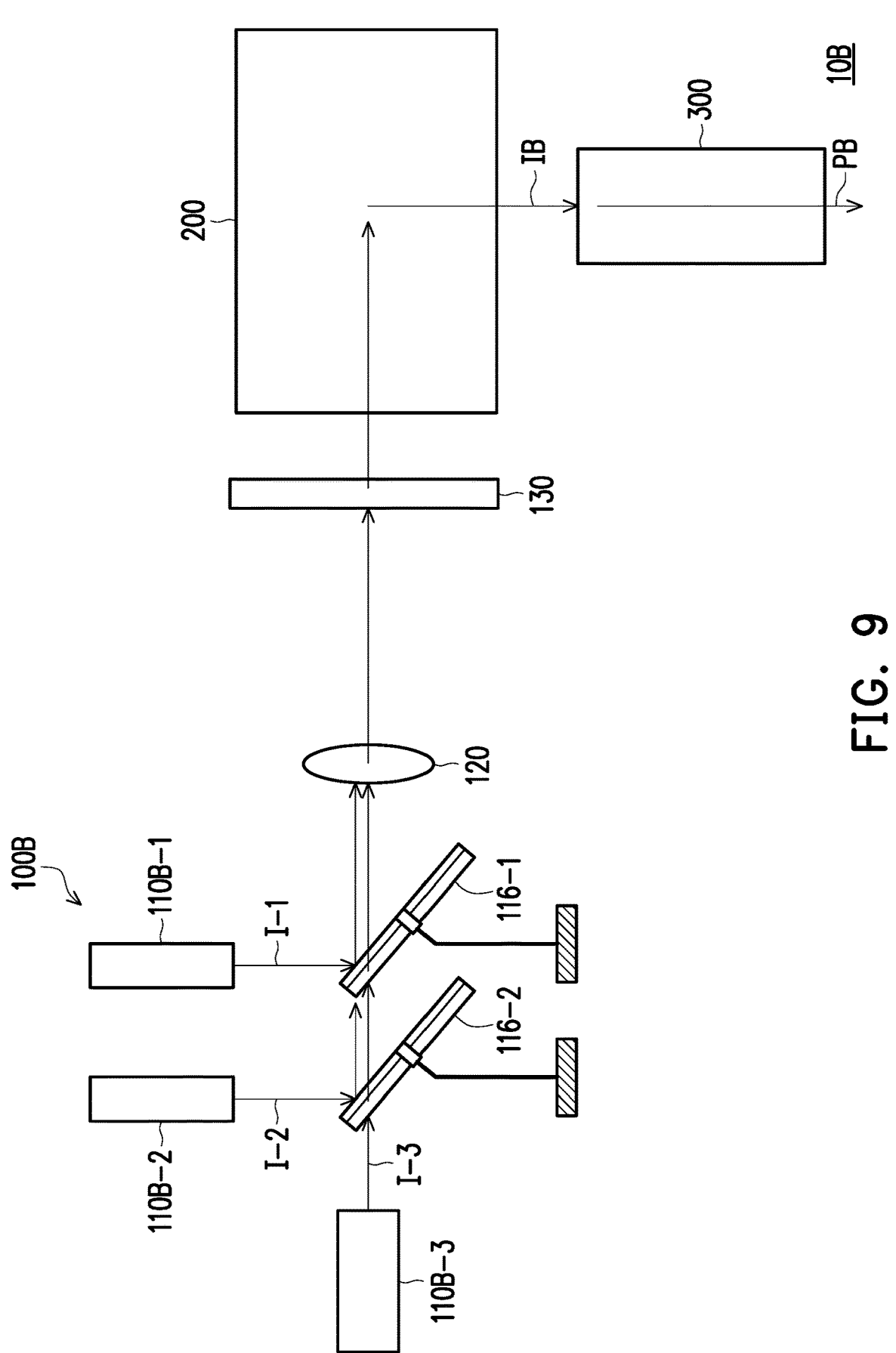
FIG. 9 is a schematic diagram of a projection apparatus according to a third embodiment of the invention.

FIG. 9 is a schematic diagram of a projection apparatus according to a third embodiment of the invention. In FIG. 9, the projection apparatus 10B of this embodiment is substantially the same as the projection apparatus 10 of FIG. 2. Their main difference is that the light-source modules 110B-1, 110B-2, and 110B-3 of the illumination system 100B further include at least a beam splitter 116-1 and 116-2. The beam splitters 116-1 and 116-2 are disposed on the transmission paths of the excitation beams I-1, I-2, and I-3 emitted from the light-source modules 110B-1, 110B-2, and 110B-3. The beam splitters 116-1 and 116-2 are located between the excitation-light sources of the light-source modules 110B-1, 110B-2, and 110B-3 and the focusing lens 120. There are, for example, two beam splitters 116-1 and 116-2 in this embodiment, and the light-source modules 110B-1, 110B-2, 110B-3 may each include an excitation-light source, the light-source modules 110B-1, 110B-2, and 110B-3 respectively emit excitation beams I-1, I-2, and I-3 of different light colors. The excitation beams I-1, I-2, and I-3 may respectively be, for example, red, green, and blue beams. However, the number of excitation-light sources of the light-source modules 110B-1, 110B-2, and 110B-3 and the light colors of the excitation beams I-1, I-2, and I-3 are not limited thereto. In addition, the beam splitter 116-2 is disposed between the beam splitter 116-1 and the light-source module 110B-3, and the beam splitter 116-1 is disposed between the beam splitter 116-2 and the focusing lens 120. The beam splitter 116-1 is configured to reflect the excitation beam I-1 and allow the excitation beams I-2 and I-3 to pass through, whereas the beam splitter 116-2 is configured to reflect the excitation beam I-2 and allow the excitation beam I-3 to pass through. The advantages of the projection apparatus 10B of the present embodiment are similar to those of the projection apparatus 10, and details thereof are not described herein again.

Figure 10:
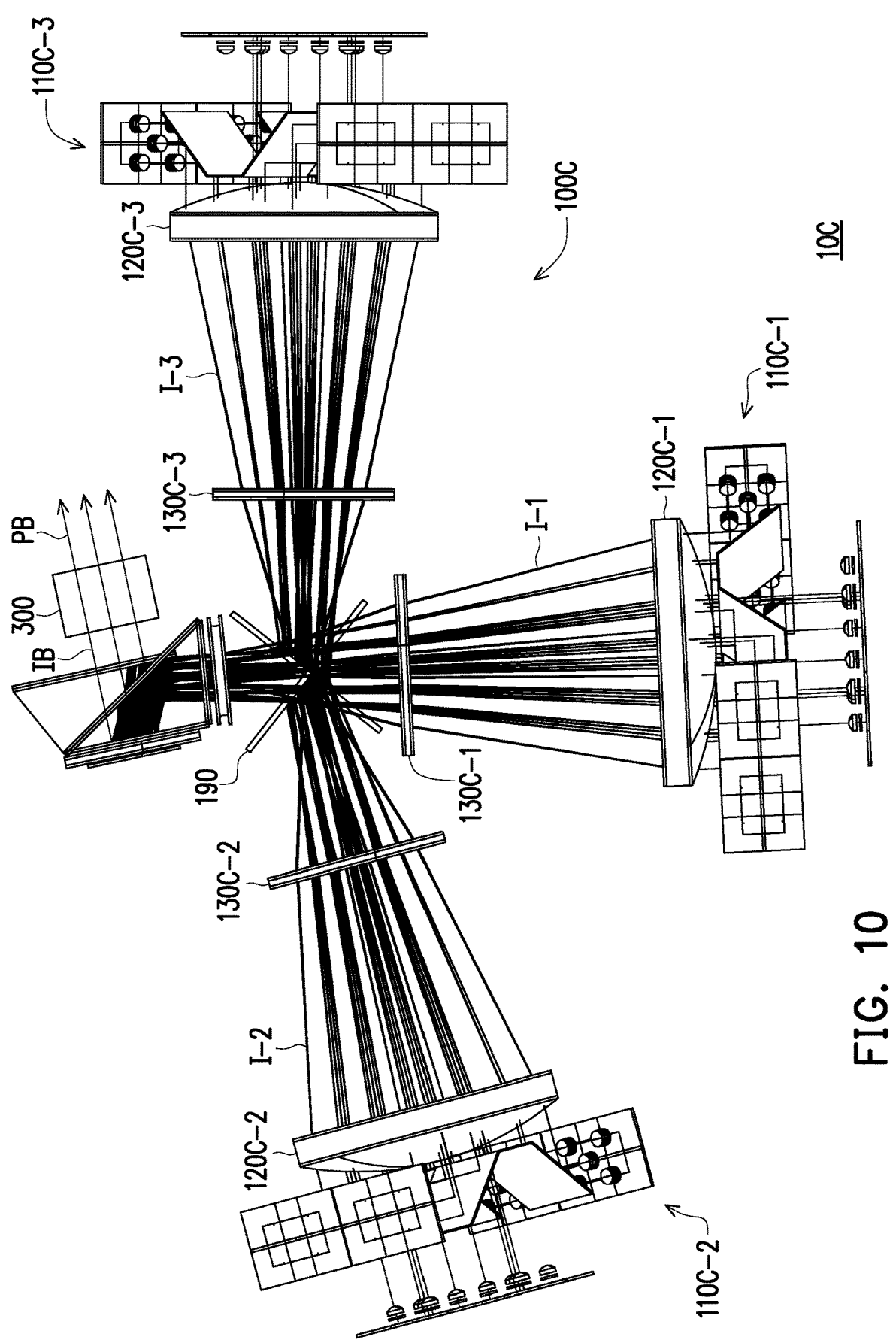
FIG. 10 is a schematic diagram of a projection apparatus according to a fourth embodiment of the invention.

FIG. 10 is a schematic diagram of a projection apparatus according to a fourth embodiment of the invention. In FIG. 10, the projection apparatus 10C of this embodiment is substantially the same as the projection apparatus 10 of FIG. 2. Their main differences are as follows. The illumination system 100C includes a plurality of light-source devices 110C-1, 110C-2, and 110C-3. And each light-source device includes the plurality of light-source modules. For example, each light-source device includes the plurality of light-source modules as shown in FIG. 2. The number of focusing lenses 120C-1, 120C-2, and 120C-3 is plural, and the number of the diffusing elements 130C-1, 130C-2, and 130C-3 is also plural. Each light-source device 110C-1, 110C-2, 110C-3 (on the optical path) respectively corresponds to one of the focusing lenses 120C-1, 120C-2, and 120C-3 and one of the diffusing elements 130C-1, 130C-2, and 130C-3.

In this embodiment, the light-source devices 110C-1, 110C-2, and 110C-3 respectively emit excitation beams I-1, I-2, and I-3 of different light colors. For example, the excitation beams I-1, I-2, and I-3 may respectively be red, green, and blue beams. However, the light colors of the excitation beams I-1, I-2, and I-3 emitted by the light-source devices 110C-1, 110C-2, and 110C-3 are not limited thereto. In one embodiment, the excitation beams I-1, I-2, and I-3 passing through the focusing lenses 120C-1, 120C-2, and 120C-3 include at least one light color.

In this embodiment, the illumination system 100C further includes a light-combining lens 190. The light-combining lens 190 is composed of, for example, a plurality of beam splitters. The light-combining lens 190 is disposed on the transmission path of the illumination beam IL transmitted from the diffusing elements 130C-1, 130C-2, and 130C-3, and the light-combining lens 190 is located between the diffusing elements 130C-1, 130C-2, 130C-3 and the light valve 200. The light-combining lens 190 is configured to guide the illumination beams IL from the diffusing elements 130C-1, 130C-2, and 130C-3 to the light valve 200. In this embodiment, as the number of the light-source devices 110C-1, 110C-2, 110C-3 and the focusing lenses 120C-1, 120C-2, and 120C-3 are both plural, more excitation-light sources 112 may be accommodated to increase the light intensity of the projection apparatus 10C. The rest of the advantages of the projection apparatus 10C of the present embodiment are similar to those of the projection apparatus 10, and details thereof are not described herein again.

Figure 11:
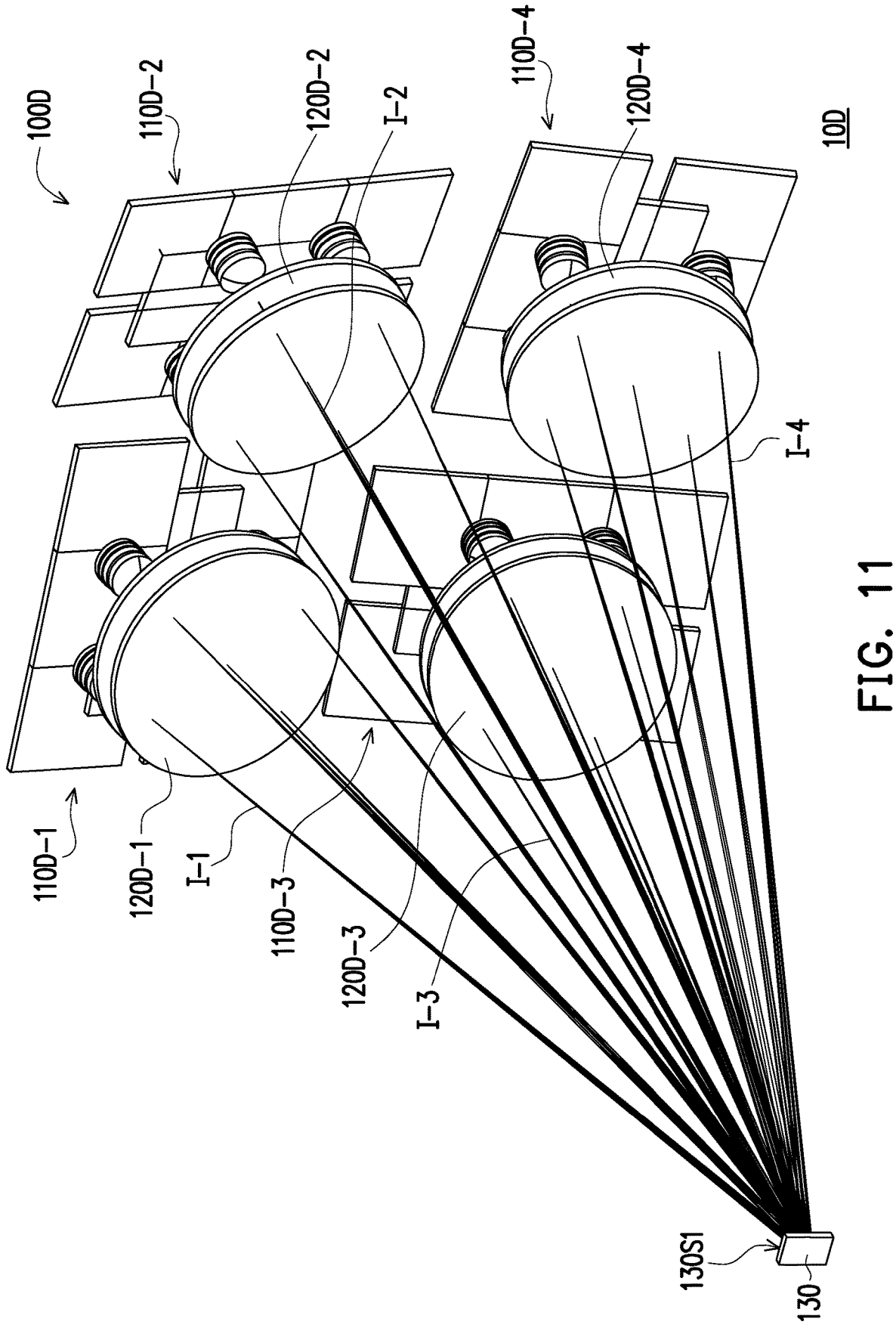
FIG. 11 is a partial schematic diagram of a projection apparatus according to a fifth embodiment of the invention.

FIG. 11 is a partial schematic view of a projection apparatus according to a fifth embodiment of the invention, in which the light valve and the projection lens are omitted. In FIG. 11, the projection apparatus 10D of this embodiment is substantially the same as the projection apparatus 10 of FIG. 2. Their main differences are that, in the illumination system 100D of this embodiment, there are multiple light-source modules 110D-1, 110D-2, 110D-3, and 110D-4, multiple focusing lenses 120D-1, 120D-2, 120D-3, and 120D-4, and one diffusing element 130. Each light-source module 110D-1, 110D-2, 110D-3, 110D-4 respectively corresponds to one of the focusing lenses 120D-1, 120D-2, 120D-3, 120D-4. The excitation beams I-1, I-2, I-3, and I-4 emitted by the light-source modules 110D-1, 110D-2, 110D-3, and 110D-4 respectively pass through the focusing lenses 120D-1, 120D-2, 120D-3, and 120D-4 and are then transmitted to the diffusing element 130. In a preferred embodiment, the light-source modules 110D-1, 110D-2, 110D-3, and 110D-4 are each distributed symmetrically on one side of the light-incident surface 130S1 of the diffusing element 130, with the geometric center (not shown in the figure) of the diffusing element 130 as the center of the circle. The focusing lenses 120D-1, 120D-2, 120D-3, and 120D-4 are also each distributed symmetrically on the side of the light-incident surface 130S1 of the diffusing element 130, with the geometric center of the diffusing element 130 as the center of the circle.

In this embodiment, as each of the light-source modules 120D-1, 120D-2, 120D-3, 120D-4 has one corresponding of the focusing lenses 120D-1, 120D-2, 120D-3, 120D-4, smaller focusing lenses 120D-1, 120D-2, 120D-3, and 120D-4 may be adopted herein to reduce the volume and production cost of the projection apparatus 10C. In one embodiment, the specifications of each group of the focusing lenses 120D-1, 120D-2, 120D-3, and 120D-4 may be configured to be the same lens to have a simpler design of the projection apparatus 10D and a reduced production cost. In addition, the projection apparatus 10D is of a non-strong focusing design, which further makes the projection apparatus 10D less susceptible to mechanical assembly tolerances. Since only one diffusing element 130 is required and no filter or mirror design is needed, in addition to the lower production cost of the projection apparatus 10D, the etendue is also reduced as the excitation beams I-1, I-2, I-3, and I-4 converge toward the diffusing element 130. The rest of the advantages of the projection apparatus 10D of the present embodiment are similar to those of the projection apparatus 10C, and details thereof are not described herein again.

In summary, in an embodiment of the invention, the projection apparatus includes at least one light-source module, at least one focusing lens, and at least one diffusing element. The focusing lens focuses the beam on the light valve, and then the diffusing element diffuses the beam asymmetrically, such that the beam does not have a focusing point between the focusing lens and the light valve, and diffuses the beam to the shape and the size of the light valve, so that the first width of the first light spot is larger than the second width of the second light spot, and the second width of the second light spot is larger than the third width of the third light spot. Compared with the projection apparatus in the market that need to use a homogenizer, a wavelength conversion element, a filter element, or other optical elements, the projection apparatus of the embodiment of the invention achieves the effects of light spot shaping and uniform illumination using only the focusing lens and the diffusing element, such that the system architecture thereof has low production cost and thus fewer optical attenuation factors.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection apparatus, comprising: an illumination system, a beam-adjusting element, a light valve, and a projection lens, wherein the illumination system is configured to provide an illumination beam, the light valve is disposed on a transmission path of the illumination beam and the light valve is configured to convert the illumination beam into an image beam, and the projection lens is disposed on a transmission path of the image beam and is configured to project the image beam out of the projection apparatus;

the illumination system comprises at least one light-source module, at least one focusing lens, and at least one diffusing element, wherein:

the at least one light-source module is configured to emit a plurality of excitation beams;

the at least one focusing lens and the at least one diffusing element are disposed on a transmission path of the plurality of excitation beams emitted from the at least one light-source module, the at least one diffusing element is disposed between the at least one focusing lens and a focal point of the at least one focusing lens, and the plurality of excitation beams sequentially pass through the at least one focusing lens and the at least one diffusing element to form the illumination beam, wherein the beam-adjusting element is disposed on a transmission path of the illumination beam transmitted from the at least one diffusing element, located between the at least one diffusing element and the light valve, and is configured to depolarize the illumination beam and/or eliminate a speckle of the illumination beam; and a maximum width of a first light spot formed by the plurality of excitation beams on a light-exit surface of the at least one focusing lens is a first width, a maximum width of a second light spot formed by the plurality of excitation beams on a light-exit surface of the at least one diffusing element is a second width, a maximum width of a third light spot formed by the illumination beam on a light-incident surface of the light valve is a third width, and a maximum width of a fourth light spot formed by the illumination beam on a light-exit surface of the beam-adjusting element is a fourth width, wherein the first width is greater than the second width, the second width is greater than the third width, the second width is greater than the fourth width, and the fourth width is greater than the third width.

2. The projection apparatus according to claim 1, wherein the at least one diffusing element is located behind ½ of a total beam transmission path, the total beam transmission path comprises a transmission path of the plurality of excitation beams emitted from the at least one light-source module to the at least one diffusing element and a transmission path of the illumination beam transmitted from the at least one diffusing element to the light valve.

3. The projection apparatus according to claim 1, wherein each of the plurality of excitation beams forms a first sub-light spot on the light-exit surface of the at least one focusing lens, a maximum width of the first sub-light spot is a first sub-width, each of the plurality of excitation beams forms a second sub-light spot on the light-exit surface of the at least one diffusing element, a maximum width of the second sub-light spot is a second sub-width, and each of illumination sub-beams formed correspondingly by each of the plurality of excitation beams passing through the at least one diffusing element forms a third sub-light spot on the light-incident surface of the light valve, a maximum width of the third sub-light spot is a third sub-width, wherein the first sub-width is greater than the second sub-width, and the second sub-width is smaller than the third sub-width.

4. The projection apparatus according to claim 3, wherein a range of the third sub-light spots covering the light valve is equal to or greater than 70% of an area of the light valve.

5. The projection apparatus according to claim 1, wherein the at least one diffusing element is an asymmetric diffusing element, and a light spot of the illumination beam passing through the at least one diffusing element has a long axis and a short axis.

6. The projection apparatus according to claim 1, wherein the at least one diffusing element comprises a plurality of lenses disposed in arrays, and each of the lenses has a long axis and a short axis.

7. The projection apparatus according to claim 1, wherein a long axis of the third light spot corresponds to a long side of the light valve, and a short axis of the third light spot corresponds to a short side of the light valve.

8. The projection apparatus according to claim 1, wherein the third light spot is quadrilateral, and an included angle between a diagonal line of the third light spot and a diagonal line of the light valve is 10 degrees or less.

9. The projection apparatus according to claim 1, wherein the at least one light-source module further comprises: at least one light-combining element, disposed on the transmission path of the plurality of excitation beams emitted from the at least one light-source module, and located between an excitation-light source of the at least one light-source module and the at least one focusing lens.

10. The projection apparatus according to claim 1, wherein the beam-adjusting element comprises at least one of a depolarizer and a de-speckle element.

11. The projection apparatus according to claim 1, wherein each of the plurality of excitation beams forms a first sub-light spot on the light-exit surface of the at least one focusing lens, a maximum width of the first sub-light spot is a first sub-width, and each of the plurality of excitation beams forms a second sub-light spot on the light-exit surface of the at least one diffusing element, a maximum width of the second sub-light spot is a second sub-width, each of illumination sub-beams formed correspondingly by each of the plurality of excitation beams passing through the at least one diffusing element forms a third sub-light spot on the light-incident surface of the light valve, a maximum width of the third sub-light spot is a third sub-width, each of the illumination sub-beams forms a fourth sub-light spot on the light-exit surface of the beam-adjusting element, a maximum width of the fourth sub-light spot is a fourth sub-width, wherein the first sub-width is greater than the second sub-width, the second sub-width is smaller than the fourth sub-width, and the fourth sub-width is smaller than the third sub-width.

12. The projection apparatus according to claim 1, wherein the beam-adjusting element is located behind ½ of a total beam transmission path, the total beam transmission path comprises a transmission path of the plurality of excitation beams emitted from the at least one light-source module to the at least one diffusing element and a transmission path of the illumination beam transmitted from the at least one diffusing element to the light valve.

13. The projection apparatus according to claim 1, wherein the illumination system further comprises: at least one first actuating element, connected to the at least one focusing lens, and configured to move a position of the at least one focusing lens, wherein a position and a size of the third light spot relative to the light-incident surface change with a movement of the at least one focusing lens.

14. The projection apparatus according to claim 1, wherein the illumination system further comprises: at least one driving element connected to the at least one diffusing element, wherein the at least one diffusing element has an optical axis passing through a center thereof, the at least one driving element is configured to drive the at least one diffusing element to rotate around the optical axis, and a position of the third light spot relative to the light-incident surface changes with a rotation of the at least one diffusing element.

15. The projection apparatus according to claim 1, wherein the illumination system further comprises: at least one second actuating element, connected to the at least one diffusing element, wherein the at least one diffusing element has an optical axis passing through a center thereof, the at least one second actuating element is configured to move a position of the at least one diffusing element along the optical axis, and a size of the third light spot expands as the at least one diffusing element moves toward the at least one focusing lens and decreases as the at least one diffusing element moves toward the light valve.

16. The projection apparatus according to claim 1, wherein the illumination system further comprises: a plurality of light-source devices comprising the at least one light-source modules, wherein a number of the at least one focusing lens is plural, a number of the at least one diffusing element is plural, and each of the light-source devices respectively corresponds to one of the at least one focusing lens and one of the at least one diffusing element.

17. The projection apparatus according to claim 16, wherein the illumination system further comprises: a light-combining lens, disposed on the transmission path of the illumination beam from the at least one diffusing element, and located between the at least one diffusing element and the light valve.

18. The projection apparatus according to claim 1, wherein the plurality of excitation beams passing through the at least one focusing lens comprise at least one light color.

19. The projection apparatus according to claim 1, wherein the illumination system further comprises: a reflector, disposed on the transmission path of the illumination beam transmitted from the at least one diffusing element, and located between the at least one diffusing element and the light valve, wherein a maximum width of a fifth light spot formed by the illumination beam on a light-incident surface of the reflector is a fifth width, wherein the second width is greater than the fifth width, and the fifth width is greater than the third width.

20. The projection apparatus according to claim 19, wherein each of the plurality of excitation beams forms a first sub-light spot on the light-exit surface of the at least one focusing lens, a maximum width of the first sub-light spot is a first sub-width, a maximum width of a second sub-light spot formed by each of the plurality of excitation beams on the light-exit surface of the at least one diffusing element is a second sub-width, each of illumination sub-beams formed correspondingly by each of the plurality of excitation beams passing through the at least one diffusing element forms a third sub-light spot on the light-incident surface of the light valve, a maximum width of the third sub-light spot is a third sub-width, and the illumination sub-beam forms a fifth sub-light spot on the light-incident surface of the reflector, and a maximum width of the fifth sub-light spot is a fifth sub-width, wherein the first sub-width is larger than the second sub-width, the second sub-width is smaller than the fifth sub-width, and the fifth sub-width is smaller than the third sub-width.

21. The projection apparatus according to claim 19, wherein the reflector is located behind ½ of a total beam transmission path, the total beam transmission path comprises a transmission path of the plurality of excitation beams emitted from the at least one light-source module to the at least one diffusing element and a transmission path of the illumination beam transmitted from the at least one diffusing element to the light valve.

22. The projection apparatus according to claim 1, wherein the at least one light-source module further comprises: at least one beam splitter, disposed on the transmission path of the plurality of excitation beams emitted from the at least one light-source module, and located between an excitation-light source of the at least one light-source module and the at least one focusing lens.

23. A projection apparatus, comprising: an illumination system, a light valve, and a projection lens, wherein the illumination system is configured to provide an illumination beam, the light valve is disposed on a transmission path of the illumination beam and the light valve is configured to convert the illumination beam into an image beam, and the projection lens is disposed on a transmission path of the image beam and is configured to project the image beam out of the projection apparatus;

the illumination system comprises at least one light-source module, at least one focusing lens, and at least one diffusing element, wherein:

the at least one light-source module is configured to emit a plurality of excitation beams;

the at least one focusing lens and the at least one diffusing element are disposed on a transmission path of the plurality of excitation beams emitted from the at least one light-source module, the at least one diffusing element is disposed between the at least one focusing lens and a focal point of the at least one focusing lens, and the plurality of excitation beams sequentially pass through the at least one focusing lens and the at least one diffusing element to form the illumination beam, wherein the at least one diffusing element is located behind ½ of a total beam transmission path, the total beam transmission path comprises a transmission path of the plurality of excitation beams emitted from the at least one light-source module to the at least one diffusing element and a transmission path of the illumination beam transmitted from the at least one diffusing element to the light valve; and a maximum width of a first light spot formed by the plurality of excitation beams on a light-exit surface of the at least one focusing lens is a first width, a maximum width of a second light spot formed by the plurality of excitation beams on a light-exit surface of the at least one diffusing element is a second width, and a maximum width of a third light spot formed by the illumination beam on a light-incident surface of the light valve is a third width, wherein the first width is greater than the second width, and the second width is greater than the third width.

24. A projection apparatus, comprising: an illumination system, a reflector, a light valve, and a projection lens, wherein the illumination system is configured to provide an illumination beam, the light valve is disposed on a transmission path of the illumination beam and the light valve is configured to convert the illumination beam into an image beam, and the projection lens is disposed on a transmission path of the image beam and is configured to project the image beam out of the projection apparatus;

the illumination system comprises at least one light-source module, at least one focusing lens, and at least one diffusing element, wherein:

the at least one light-source module is configured to emit a plurality of excitation beams;

the at least one focusing lens and the at least one diffusing element are disposed on a transmission path of the plurality of excitation beams emitted from the at least one light-source module, the at least one diffusing element is disposed between the at least one focusing lens and a focal point of the at least one focusing lens, and the plurality of excitation beams sequentially pass through the at least one focusing lens and the at least one diffusing element to form the illumination beam;

the reflector is disposed on a transmission path of the illumination beam transmitted from the at least one diffusing element, and located between the at least one diffusing element and the light valve;

a maximum width of a first light spot formed by the plurality of excitation beams on a light-exit surface of the at least one focusing lens is a first width, a maximum width of a second light spot formed by the plurality of excitation beams on a light-exit surface of the at least one diffusing element is a second width, a maximum width of a third light spot formed by the illumination beam on a light-incident surface of the light valve is a third width, and a maximum width of a fifth light spot formed by the illumination beam on a light-incident surface of the reflector is a fifth width, wherein the first width is greater than the second width, the second width is greater than the third width, the second width is greater than the fifth width, and the fifth width is greater than the third width, and wherein each of the plurality of excitation beams forms a first sub-light spot on the light-exit surface of the at least one focusing lens, a maximum width of the first sub-light spot is a first sub-width, a maximum width of a second sub-light spot formed by each of the plurality of excitation beams on the light-exit surface of the at least one diffusing element is a second sub-width, each of illumination sub-beams formed correspondingly by each of the plurality of excitation beams passing through the at least one diffusing element forms a third sub-light spot on the light-incident surface of the light valve, a maximum width of the third sub-light spot is a third sub-width, and the illumination sub-beam forms a fifth sub-light spot on the light-incident surface of the reflector, and a maximum width of the fifth sub-light spot is a fifth sub-width, wherein the first sub-width is larger than the second sub-width, the second sub-width is smaller than the fifth sub-width, and the fifth sub-width is smaller than the third sub-width.

* * * * *